United States Patent [19]

Hutchinson, Jr.

[11] 4,363,869
[45] Dec. 14, 1982

[54] PHOTOGRAPHIC DEVELOPING PROCESS

[76] Inventor: Robert E. Hutchinson, Jr., 6714 Hanover Ave., Richmond, Va. 23226

[21] Appl. No.: 312,616

[22] Filed: Oct. 19, 1981

Related U.S. Application Data

[63] Continuation of Ser. No. 179,910, Aug. 19, 1980, abandoned.

[51] Int. Cl.³ .............................................. G03C 5/30
[52] U.S. Cl. .................................. 430/427; 430/463; 430/449; 430/439
[58] Field of Search ............... 430/427, 463, 482, 492, 430/439, 449

[56] References Cited

U.S. PATENT DOCUMENTS

| | | | |
|---|---|---|---|
| 1,984,086 | 12/1934 | Russell | 430/427 |
| 2,178,896 | 11/1939 | Pifer | 430/419 |
| 2,662,014 | 12/1952 | Umberger | 430/463 |
| 2,819,165 | 1/1958 | MacKey | 430/427 |
| 2,885,288 | 5/1959 | Beswick et al. | 430/427 |
| 3,161,513 | 12/1964 | Henn | 430/419 |
| 3,265,501 | 8/1966 | Johnson | 430/419 |

OTHER PUBLICATIONS

Jacobson, Photographic Theory and Practice, American Photographic Book Publishing Company, Inc., N. Y., N. Y., pp. 514–515.

Primary Examiner—Won H. Louie, Jr.
Attorney, Agent, or Firm—Norman B. Rainer

[57] ABSTRACT

A two-component system for developing photosensitive materials provides a developing process which is not highly dependent upon critical values of time and temperature. The resultant developed materials possess less graininess than might be expected with conventional developer systems. The two-composition system is comprised of a first and a second composition employed as aqueous solutions, each containing an alkali sulfite. The first compositon comprises a phenylamine developer compound and hydroquinone.

1 Claim, No Drawings

PHOTOGRAPHIC DEVELOPING PROCESS

This application is a continuation of U.S. patent application Ser. No. 06/179,910, filed Aug. 19, 1980, for Photographic Developer Composition and Process, abandoned.

BACKGROUND OF THE INVENTION

This invention concerns a photographic developer system comprised of two separate compositions adapted to be sequentially utilized in the treatment of photosensitive materials, and a process utilizing said developer system in the treatment of silver-based photosensitive materials capable of producing black and white pictures.

Photosensitive materials employed for photographic purposes are generally comprised of a supporting sheet such as film or paper, one surface of which is coated with a uniform layer of a hydrophilic polymer, such as gelatine, which contains an emulsion of finely divided particles of photosensitive silver compounds such as silver chloride, silver bromide and the like. When a clear film is employed as the supporting sheet, the resulting developed product will generally be a "negative" wherein portions of the photosensitive material exposed to the light of a light image are opaque, and the non-exposed portions are transparent.

The negative or "film" may subsequently be utilized in producing black and white pictures or "prints". Photosensitive material for making prints, generally referred to as printing or enlarging paper, utilizes a white paper as the supporting sheet. The emulsion coating of the printing paper is exposed to a light image formed by passing light through a negative. Upon development of the exposed printing paper, those portions struck by light will be black, and regions unstruck by light because of the occluding nature of the opaque portions of the negative, will be white. In this manner, the print will be an accurate rendition of the photographed scene insofar as light-appearing objects will appear white, dark-appearing objects will appear black, and various intermediate gradations from white to black will also be present.

In the developing process, the light exposed film or print paper is immersed in an aqueous solution of a "developer", whereupon particles of silver compound which have been struck by light are chemically reduced to black atomic silver. Developer compositions are generally comprised of an aqueous solution containing one or more chemical reducing agents and other species which modify the action of said reducing agent or provide auxilliary effects. The most generally used reducing agents are hydroquinone and phenylamines containing the chemical configuration

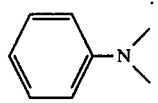

Typical phenylamines include N-methyl-p-aminophenol sulfate, 1-phenyl-3-pyrazolidone and its derivatives, triaminophenols, and p-phenylenediamine. N-methyl-p-aminophenol sulfate is commercially available under various trademarks such as Metol, Elon, Photol, Verol, Rhodol, Armol, Genol and Pictol; and will hereinafter be referred to as Metol.

The use of a developer formulation comprised of Metol, hydroquinone and sodium sulfite has been disclosed in U.S. Pat. Nos. 3,265,501; 2,178,896; 3,161,513; and elsewhere. Such mixtures generally afford characteristics representing a compromise of the several features sought in a developer formulation. The combination of Metol and hydroquinone provides a synergistic effect which produces more acceptable image contrast than Metol alone. The sodium sulfite is considered to function to preserve the developer by minimizing aerial oxidation, and stabilize the developer by interacting with the oxidative byproducts of the development process.

Following development, the photosensitive material is treated with an aqueous solution, generally called fixer, hypo, or clearing agent, the primary purpose of which is to dissolve out of the hydrophilic polymer coating remaining unreduced silver compounds. The black silver remains within the coating. By virtue of said development process, areas of the photosensitive material upon which light impinged will be black. The other areas, in the case of a negative will be transparent, and in the case of a printing paper will be white.

It has long been known that, in the developing process to create negatives or prints from latent images on exposed photosensitive material, factors of time and temperature must be carefully observed. Longer durations of contact of the photosensitive material with the developer solution, and higher temperatures of said solution cause more intense developing action with consequent formation of larger quantities of silver in black form in the case of black-and-white photosensitive materials. Shorter durations of contact and lower temperatures produce lesser quantities of silver in the photosensitive material.

Securement of optimum results in the development process is particularly difficult for those who may lack extensive experience in the techniques involved or be without adequate equipment to accurately measure and control the temperature and/or time of the development process. Such difficulties are particularly encountered by students or others making initial efforts to develop photosensitive materials.

Another general problem encountered as a result of the developing process is that the black particles of silver, instead of remaining uniformly dispersed within the emulsion coating, may agglomerate. This causes a "grainy" appearance and is particularly noticeably when a negative having high "grain" is utilized to make an enlarged print using a photographic enlarger. Excessive grain in the print is objectionable because it detracts from the realistic rendition of the original scene photographed. Although developer compositions specially formulated to produce fine grain have been known, such compositions do not usually enjoy a long "shelf life", namely stability upon long term storage.

It is accordingly an object of the present invention to provide a photographic developer system which, in its action upon a photosensitive material, is relatively insensitive to variations of time and temperature.

It is another object of this invention to provide a photographic developer system of the aforesaid nature possessing a relatively long shelf life.

It is a further object of the invention to provide a photographic developer system of the aforesaid nature capable of producing black and white pictures evidencing relatively little graininess.

It is a still further object of the present invention to provide a process for the development of black and white film to produce a negative evidencing relatively little graininess.

These objects and other objects and advantages of the invention will be apparent from the following description.

SUMMARY OF THE INVENTION

The above and other beneficial objects and advantages are accomplished in accordance with the present invention by the provision of a first and a second developer composition, each in the form of either a dry powder mixture or aqueous solution thereof intended to be utilized in the treatment of photographic materials.

The first composition is comprised of a phenylamine developer compound, sodium sulfite, and hydroquinone. An alkali metal bromide such as potassium bromide may optionally be included in said first composition.

The second composition is comprised of borax and sodium sulfite. An alkali metal carbonate such as sodium carbonate may optionally be included in said second composition.

The process of the present invention comprises the treatment of a photosensitive material in the absence of photoactive light with an aqueous solution of said first developer composition, causing said photosensitive material to remain in contact with said first composition for 2 to 5 minutes at a temperature in the range of 60° F.–85° F., separating said first composition from said photosensitive material, treating said photosensitive material with an aqueous solution of said second developer composition for a duration of 2 to 5 minutes at a temperature in the range of 60° F.–85° F., separating said second composition from said photosensitive material and rinsing with a water stop bath, treating said photosensitive material with an aqueous solution of a clearing agent capable of dissolving unreduced silver compounds, removing said clearing agent, washing said photosensitive material with water, and drying.

The treatment of the photosensitive material with the various aqueous solutions is preferably by immersion, although in certain continuous industrial applications spray treatments may be utilized. The term "photoactive" light is intended to designate ordinary white light such as daylight or the light of clear white incandescent bulbs. Certain wavelengths of light, having a red or yellow color, may under certain conditions and at low intensities be utilized during the development process. The water stop bath may be either water alone or water containing an acidic substance such as acetic acid which will cause development action to cease. Although the developer system and process of this invention may be applied to printing papers, the preferable application is to roll film in the production of black and white negatives.

DETAILED DESCRIPTION OF THE PREFERRED EMBODIMENT

The two compositions of the developer system of this invention may be packaged for use either as dry powder blends, or as aqueous solutions. One advantage of the dry powder blend embodiment is that it is extremely stable with respect to chemical changes upon ageing. Another advantage of the dry blend is that it has reasonably small weight and volume in comparison with solutions, and can be inexpensively packaged in non-fragile paper or film containers. A still further advantage of the dry powder blend embodiment of the compositions of the developer system is that the cost of shipping and storage is minimized because of the lower weight and smaller space requirements in comparison with solutions.

The aqueous solution embodiment of the compositions affords the user the convenience of having the compositions in a ready-to-use form at accurate concentration and in a container which the user would need even if he purchased the composition as a powder blend from which he would prepare a solution.

The first composition is preferably comprised of Metol, sodium sulfite and hydroquinone, the weight ratio of said ingredients being preferably as follows:

| Ingredient | Range (Parts by Weight) |
|---|---|
| Metol | 1.9–2.1 |
| Sodium Sulfite | 46–54 |
| Hydroquinone | 4–3 |

Metol and hydroquinone may be characterized as water soluble solid organic compounds having reduced properties and wherein the reaction products of said compounds produced in the developing process are also water soluble.

An aqueous solution comprising said first composition may be prepared by dissolving in water either an appropriate quantity of a dry powder blend of the ingredients, or the separate component ingredients. Said aqueous solution should have a concentration such that one quart of the solution will contain between 56 and 60 grams of said first composition.

The second composition is preferably comprised of borax and sodium sulfite, the weight ratio of said ingredients being preferably as follows:

| Ingredient | Range (Parts by Weight) |
|---|---|
| Borax | 40–60 |
| Sodium Sulfite | 90–110 |

As in the case of the first composition, an aqueous solution comprising said second composition may be prepared by dissolving in water either an appropriate quantity of a dry powder blend of the ingredients, or the separate component ingredients. Said aqueous solution should have a concentration such that one quart of the solution will contain between 130 and 140 grams of said second composition.

Aqueous developer solutions of said first and second compositions will be basic, having pH values between about 7.5 and 12. It is to be noted that both compositions contain an alkali metal sulfite such as sodium sulfite. Other alkali metal sulfites, such as potassium sulfite may however be utilized. It is to be further noted that the second composition does not require the presence of an organic compound having reducing properties.

The following examples further illustrate my invention.

EXAMPLE 1

A first developing solution was made by dissolving in one quart of water the following ingredients:
2 grams Metol 50 grams sodium sulfite
6 grams hydroquinone
1 gram potassium bromide.

A second developing solution was made by dissolving in one quart of water the following ingredients:
50 grams borax
100 grams sodium sulfite
1 gram sodium carbonate A 36 exposure roll of 35 mm Kodak Tri-X film was loaded into a spiral reel under darkroom conditions and the reel was inserted into a close-fitting light proof FRbrand cylindrical tank of 16 oz. capacity.

Sixteen ounces of the first solution, at a temperature of 70° F., were poured from a storage bottle into the tank. The reel was mildly rotated for three seconds every 30 seconds. After 3 minutes, the solution was poured out of the tank and returned to its storage bottle.

Sixteen ounces of the second solution, at a temperature of 70° F., were poured from a storage bottle into the tank. The reel was mildly rotated for three seconds every 30 seconds. After 3⅓ minutes, the solution was poured out of the tank and returned to its storage bottle.

The tank was then filled with water at 70° F. Following mild agitation for 5 seconds, the water was poured off and the tank was re-filled with a standard aqueous solution of Kodak acid fixer at 70° F. After five minutes immersion in the fixer solution, the solution was poured off. A stream of running water at 70° F. was then entered into the tank and continued for 25 minutes to wash all chemicals from the film. The film was then immersed in a solution comprised of ten drops of Kodak Photoflow (a nonionic surfactant) in a quart of water. The film was subsequently removed from the reel and hung vertically in a dust-free flow of air until dry.

The resultant negatives were utilized in conventional manner to make photographic enlargements of 16"×20" size on Kodak Kodabromide paper. Close examination of the enlargements revealed a remarkable lack of grain and an exceptionally good range of gradations of tone density. This was particularly evident when the prints were compared with prints made from the same film developed in a standard Microdol-X developer.

The developer solutions were found to have the capacity to develop thirty 36 exposure rolls of 35 mm black and white film.

EXAMPLE 2

The developer solutions and process of Example 1 were utilized in the development of a roll of 35 mm Tri-X film which had been exposed in a manner identical to the roll developed in Example 1.

The exceptions to the process of Example 1 were that the temperature of the first developer solution was 68° F. and the temperature of the second solution was 63° F.

Prints made from the resultant negatives were found to have substantially the same quality as the prints made from the negatives produced in Example 1, thereby indicating that the developer system and its manner of use will accommodate variations in temperature.

Although the developer system of this invention has been illustrated with respect to black and white photosensitive material, it may also be used as the first developer step in a color photosensitive meratial. Although not wishing to be bound by theoretical explanations, it is felt that the hydroquinone component of the first developer gives contrast to the image produced by the action of the Metol or equivalent amine reducing agent, and the sodium sulfite serves as both a preservative for the solution and a solvent for silver halides.

While particular examples of the present invention have been shown and described, it is apparent that changes and modifications may be made therein without departing from the invention in its broadest aspects. The aim of the appended claims, therefore, is to cover all such changes and modifications as fall within the true spirit and scope of the invention.

Having thus described my invention, what is claimed is:

1. A process for the development of photographic material initially containing silver halide to produce a silver image, said photographic material having been imagewise exposed to radiation, said process comprising:
    (a) uniformly treating said photographic material with a first aqueous solution having a pH between 7.5 and 12 and comprising

| Component | Weight Ratio |
|---|---|
| N—methyl-p-aminophenol sulfate | 1.9–2.1 |
| sodium sulfite | 46–54 |
| hydroquinone | 4–8 | said first solution containing between about 56 and 60 grams of said components per quart,
    (b) separating said photographic material from said first solution,
    (c) treating said photographic material uniformly with a second aqueous solution having a pH between 7.5 and 12 and comprising

| Component | Weight Ratio |
|---|---|
| borax | 40–60 |
| sodium sulfite | 90–110 | said second solution containing between about 130 and 170 grams of said components per quart,
    (d) separating said photographic material from said second solution,
    (e) fixing,
    (f) washing, and
    (g) drying said photographic material.

* * * * *